Oct. 31, 1972  J. J. LASKO ET AL  3,701,563

LOCKING MEANS FOR DUMP TRUCK

Filed Jan. 26, 1971

INVENTORS
JOHN J. LASKO
DOUGLAS G. HOUGH
BY Smart & Biggar
ATTORNEYS.

United States Patent Office 3,701,563
Patented Oct. 31, 1972

3,701,563
LOCKING MEANS FOR DUMP TRUCK
John Jaye Lasko and Douglas Gordon Hough, Prince George, British Columbia, Canada, assignors to Douglas Gordon Hough, Prince George, British Columbia, Canada
Filed Jan. 26, 1971, Ser. No. 109,805
Claims priority, application Canada, Jan. 22, 1970, 072,869
Int. Cl. B62d 27/00
U.S. Cl. 298—38                                        6 Claims

ABSTRACT OF THE DISCLOSURE

A clamping device for securing the free end of the dump body of a dump body assembly in which the clamping device includes a pin secured to the body and engageable in a slot in a locking member rotatably mounted in the frame between positions in which the slot can receive or release the pin and in which the slot may retain the pin. The locking member is urged in an over-center fashion between the two positions.

BACKGROUND OF THE INVENTION

This invention relates to dump body assemblies including a dump body and a frame and particularly to a clamping device for holding the dump body to the frame in the lowered position of the dump body.

In dump body assemblies, the dump body is hingedly connected to the frame and is provided with means such as a hydraulic ram for tipping the body about the hinge axis to a raised position for the purpose of emptying contents of the body. When the body is in its lowered position the body is clamped to the frame. Preferably the clamping device is located at a point on the dump body remote from the hinge.

SUMMARY OF THE INVENTION

According to the present invention a dump body assembly comprises a frame, a dump body hingedly mounted at one end of the frame for movement toward and away from the frame to lowered and raised positions of the assembly, and a clamping device for releasably securing the other end of the body to the frame. The clamping device comprises a first housing mounted on the said other end of the body and a second housing secured to the frame in a position to coact with the first housing. One of the housings includes a securing pin extending along a first generally horizontal axis. The other housing includes a locking member mounted for rotation in the other housing about a second horizontal axis generally parallel to the first axis. The locking member has a pin receiving slot therein and the member is rotatable to orient the slot in a first position above a horizontal plane to receive the securing pin and in a second position below the horizontal plane to retain the pin. Resilient means act on the locking member to urge the member into each of the first and second positions.

Preferably the housings are mounted so as to extend parallel to the hinge axis of the body and the frame and the axis of the securing pin and the axis of rotation of the locking member extend generally perpendicular to the hinge axis. The first housing may then include two securing pins and the second housing may include two locking members, the housings being telescopable over one another to locate the pins in the slots.

The clamping device of the invention is automatic in operation in that, on lowering of the dump body, the pin or pins enter the slot or slots and rotate the locking member or members over-center so that the resilient means urge the locking member or members into the second position to retain the pins. When it is desired to raise the dump body actuation of the lifting means causes the locking member or members to rotate in the opposite direction to allow the pin or pins to escape from the slot or slots.

The assembly according to the invention and the clamping device thereof securely holds the dump body on the frame in the lowered position of the dump body and eliminates movement of the clamping device and of the dump body. Elimination of such movement prevents wear on the hinge pins at the rear of the dump box.

Preferably, at least one resilient pad is mounted on one of the housings so as to act against the other housing in the lowered position of the dump body. The resilient pad absorbs any small vibration in the assembly during use and reduces noise and further reduces any wear in the component parts.

The resilient means may be a spring acting between the locking member and the housing or a fluid pressure piston and cylinder unit.

BRIEF DESCRIPTION OF DRAWINGS

The invention will now be described, by way of example only, with reference to embodiments of the invention which are illustrated in the accompanying drawings, in which.

DETAILED DESCRIPTION OF EMBODIMENTS

Figure 1:
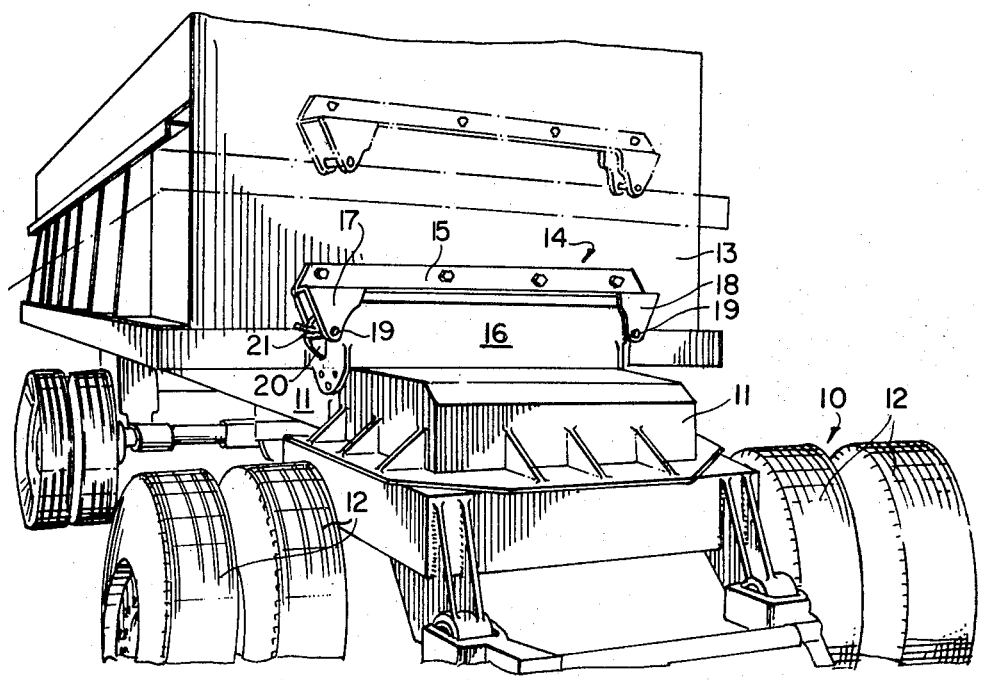
FIG. 1 is a general perspective view of a dump truck assembly.
Figures 2, 3:
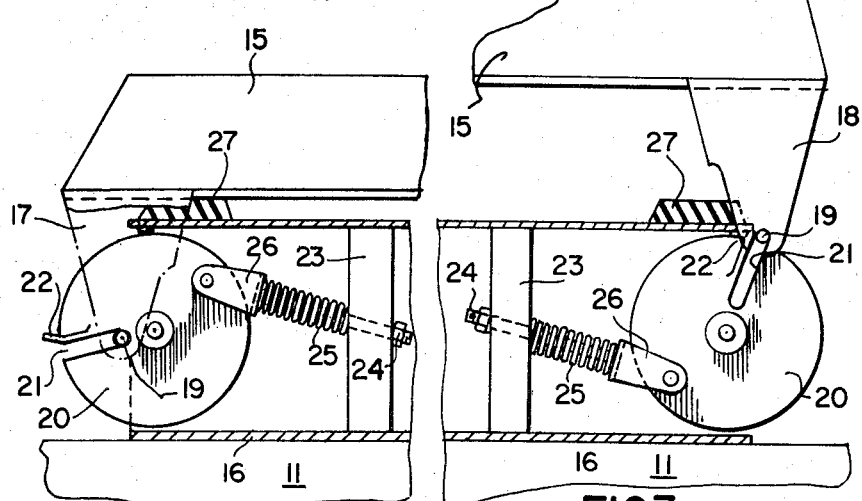
FIG. 2 is a view, partly broken away, of one end of a clamping device of the present invention showing one position thereof.
FIG. 3 is another view, partly broken away, of the other end of the clamping device of FIG. 3 showing a further position of the clamping device.

Referring now to FIGS. 1 to 3, there is shown in FIG. 1 a vehicle 10 having a frame 11 mounted on wheels 12 for movement of the vehicle. A dump body 13 is hingedly mounted at the rear end of the frame on laterally extending hinges, which are not shown. At the front end of the vehicle there is provided a clamping device 14. As is shown in chain lines in FIG. 1 the dump body 13 may be raised about the hinge axes by means of lifting devices (not shown).

The clamping device 14 comprises a first housing 15 and a second housing 16. The housings are mounted so as to extend laterally of the vehicle and generally parallel to the hinge axes of the assembly.

The housing 15 is secured to the dump body and comprises brackets 17 and 18 at each end of the housing 15. The brackets 17 and 18 each contain therein a securing pin 19.

The housing 16 is secured to the frame 11 and extends laterally of the frame and generally parallel to the hinge axes. The housing 16 is of generally the same length as housing 15 but it has a longitudinal dimension slightly smaller than the spacing of the flanges of the brackets 17 and 18 so that the brackets 17, 18 are telescopable over the housing 16.

The housing 16 is in the form of a generally rectangular tube.

Secured at each end of the housing 16 are locking members 20. The locking members, as shown in FIGS. 2 and 3, are in the form of discs rotatably mounted at their centers about axes extending generally longitudinally of the vehicle and therefore perpendicular to the hinge axes. The disc 20 is provided with a pin receiving slot 21 which extends generally radially of the disc to the periphery of the disc. Each disc is provided adjacent one wall of the slot 21 with a projection or stop 22.

As shown in FIGS. 2 and 3 the discs 20 are rotatably mounted in the ends of the housing 16 so that the portions of the discs 20 containing slots 21 protrude beyond the ends of the housing. The housing 15 is constructed so that the pins 19 are located just laterally beyond the ends of the housing 16 so that, with the assembly in the position shown in FIG. 3, the pins 19 may enter the slots 21 on lowering of the dump body 13.

Spaced inwardly of the discs 20 are supports 23 rigidly secured to the housing 16. Rods 24 extend between discs 20 and the supports 23. The rods 24 are pivotally connected to the discs 20 and are free to move both pivotally and linearly with respect to the supports 23. Springs 25 act between the supports 23 and yokes 26 on the ends of the rods 24. The point of connection between the yokes 26 and the disc 20 is chosen so that rotation of the locking members about their axes between the position shown in FIG. 3 and the position shown in FIG. 2 causes the spring 25 to urge the locking members to each of these two positions, the locking member going over-center with respect to the spring on passing between the two positions.

Secured to the upper surface of the housing 16 are resilient pads 27 which are so located that on lowering of the dump body the bottom surface of the housing 15 contacts the pad 27.

In use of the device according to the invention the body is first lifted to its raised position. The discs 20 are then both rotated to the position shown in FIG. 3 that is with the slots 21 facing upwardly. The dump body 13 is then lowered toward the frame 11 and in the last part of the lowering movement the pins 19 enter the slots 21 and act against the lower surfaces of the slots. The weight of the dump body causes the locking members to rotate about their axes and the spring 25 to be compressed. When the member has rotated a predetermined distance the points of connection of the yokes 26 and to the discs 20 cross the horizontal plane containing the axes of rotation of the discs. The spring pressure now acts to continue the rotation of the discs and to clamp the housing 15 against the housing 16 by the action of the upper surface of the slots on the pins 19. The housing 15 is held firmly against the resilient pads 27 on the housing 16. When it is desired to raise the body 13 the lifting means are operated. The lifting means act against the weight of the body and its contents and against the action of the springs 25 to raise the body and therefore to rotate the discs 20 by reason of the interaction of the pins 19 and the upper surfaces of the slots 21. Again, when the discs are rotated sufficiently far to place the points of connection of the yokes 26 and discs 20 above the horizontal plane the system goes over-center and the springs urge the discs around to place the projections 22 against the top plate of the housing 16 so as to determine the position of the discs 20 in the raised position of the assembly. The pins 19 are then free to escape from the slots 21 during further raising of the dump body.

When the assembly is in its closed position, the pins 19 are urged down by the action of the springs 25 through the upper surfaces of the slots 21. This prevents substantial vibration movement of the body 13 and eliminates not only noise but wear on the hinge pins of the assembly. It will be seen that operation of the clamping device is completely automatic and that it is not necessary that the operator ensure that the body is clamped to the frame in the lowered position of the assembly. The present invention therefore prevents the vehicle moving in the lowered position of the assembly without the dump box being clamped to the frame. Furthermore, the clamping effect is not the result of the tightening of levers or the equivalent and is built into the system, thus the clamping device can be designed so as to provide the appropriate clamping forces between the dump box and the frame. Adjustment means may be included to determine the required spring effect.

Figure 4:
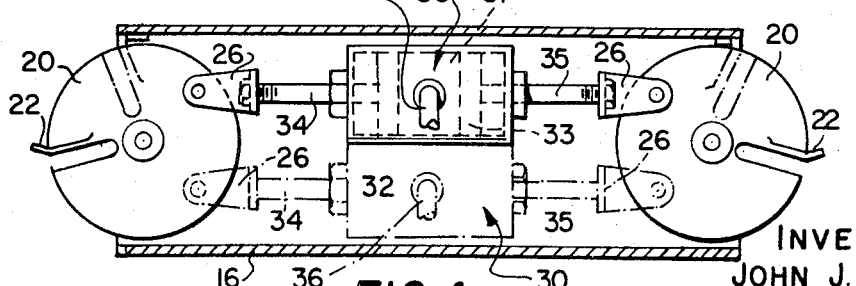
FIG. 4 is a sectional view of an alternative form of clamping device embodying the invention.

In FIG. 4, there is shown a modification of the present invention in which the resilient means consists in a pressurized fluid cylinder and piston unit 30. Similar elements appearing in FIG. 4 and FIGS. 1 to 3 bear the same reference numerals. The cylinder 30 is free to move in guides, not shown, in the manner indicated by chain lines in FIG. 4. The cylinder unit 30 comprises a cylinder housing 31 and pistons 32 and 33. The pistons 32 and 33 are connected to the yokes 26 by piston rods 34 and 35 so that rotation of the discs 20 causes movement of the pistons 32 and 33 toward each other. The cylinder defined between the pistons 32 and 33 is filled with a compressible fluid such as air. The fluid in the cylinder may be pressurized before operation of the clamping device through conduit 36. Operation of the clamping device between the two positions of the discs 20 causes the pistons 32 and 33 to approach each other thereby reducing the volume in the cylinder and the system connected thereto and thereby increasing the pressure of the fluid. Again, the clamping device is of the over-center type and when the points of connection of the yokes 26 and the discs 20 pass across the horizontal plane containing the axis of rotation of the discs 20 there will be a force urging the discs on continued rotation. Apart from the operation of the cylinder and piston unit, the device in FIG. 4 works in the same way and has the same beneficial results as the device shown in FIGS. 1 to 3.

What we claim as our invention is:

1. A dump body assembly comprising a frame, a dump body hingedly mounted at one end thereof on said frame for movement towards and away from the frame to lowered and raised positions of the assembly, and a clamping device for releasably securing the other end of the body to the frame, said clamping device comprising a first housing mounted on the said other end of the body and a second housing secured to the frame in a position to coact with the first housing, one of said housings including at least one securing pin extending along a first generally horizontal axis, and the other of said housings including at least one locking member mounted for rotation in said other housing about a second horizontal axis generally parallel to said first axis, a pin-receiving slot in said member, said member being rotatable to orient said slot in a first position above a horizontal plane and on one side of said second axis to receive said pin and in a second position below said plane on the other side of said second axis to retain said pin, and resilient means acting on said member to urge the member into each of said positions.

2. An assembly according to claim 1 wherein said housings are mounted to extend parallel to the axis of hinging of said body to said frame and said first and second axes extend generally perpendicular to said hinging axis, and wherein said first housing includes two securing pins and said second housing includes two locking members, said first housing being telescopable over said second housing and having the pins at the ends thereof and the portions of said locking members containing the slots protruding from the ends of the second housing, whereby on telescoping of the housings the pins enter the slots.

3. An assembly according to claim 1 wherein said resilient means is a spring acting between the said member and its associated housing.

4. An assembly according to claim 1 wherein said resilient means is a fluid pressure piston and cylinder unit having two pistons defining a single working cylinder, said pistons being operatively connected one to each of the members.

5. An assembly according to claim 1 wherein said locking member is a disc rotatably mounted at its centre and said slot extends radially from the periphery of the disc, a stop for contacting the second housing protruding from said disc adjacent to the slot.

6. An assembly according to claim 1 wherein at least one resilient pad is secured to a surface of one of the housings so as to be between and in contact with the housings in said lowered position.

References Cited
UNITED STATES PATENTS

| | | | |
|---|---|---|---|
| 3,542,430 | 11/1970 | Mauroff | 298—38 |
| 1,658,236 | 2/1928 | Frazier | 298—23 B |
| 2,150,371 | 3/1939 | Furnish | 296—35 A |

ROBERT J. SPAR, Primary Examiner

U.S. Cl. X.R.

296—35 A